(12) United States Patent
Li

(10) Patent No.: US 10,165,240 B2
(45) Date of Patent: Dec. 25, 2018

(54) APPARATUS AND METHOD FOR CONTROLLING LASER PROJECTOR TO OPERATE

(71) Applicant: HISENSE CO., LTD., Qingdao (CN)

(72) Inventor: Song Li, Qingdao (CN)

(73) Assignees: Hisense Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 75 days.

(21) Appl. No.: 15/388,120

(22) Filed: Dec. 22, 2016

(65) Prior Publication Data

US 2017/0104970 A1  Apr. 13, 2017

(30) Foreign Application Priority Data

May 20, 2016 (CN) .......................... 2016 1 0336598
May 20, 2016 (CN) .......................... 2016 1 0336688
May 20, 2016 (CN) .......................... 2016 1 0344208

(51) Int. Cl.
*H04N 9/31* (2006.01)
*G03B 21/16* (2006.01)
*G02B 27/00* (2006.01)

(52) U.S. Cl.
CPC ....... *H04N 9/3194* (2013.01); *G02B 27/0006* (2013.01); *G03B 21/16* (2013.01);
(Continued)

(58) Field of Classification Search
CPC .. G03B 21/16; G03B 21/2053; G03B 21/206; G03B 21/42; G03B 21/54; H04N 9/3194;
(Continued)

(56) References Cited

U.S. PATENT DOCUMENTS

2007/0024816 A1    2/2007  Hsu et al.
2009/0040471 A1*   2/2009  Noda ..................... G03B 21/16
                                                                  353/61
(Continued)

FOREIGN PATENT DOCUMENTS

CN    102385381    3/2012
CN    102450021    5/2012
(Continued)

OTHER PUBLICATIONS

Office Action from corresponding Chinese Application No. 201610344208.4 dated Dec. 5, 2017 (8 pages).
(Continued)

*Primary Examiner* — Ryan D Howard
(74) *Attorney, Agent, or Firm* — Harness, Dickey & Pierce, P.L.C.

(57) ABSTRACT

Disclosed are an apparatus and method for controlling a laser projector to operate. The method includes: obtaining a plurality of operating parameters of the laser projector in operation; comparing each of obtained operating parameters with a preset parameter, and judging whether the laser projector fails, wherein the preset parameters are parameters of the laser projector which is operating normally; and determining failure information of the laser projector according to a result of a comparison if it is judged that the failure occurs.

19 Claims, 8 Drawing Sheets

(52) U.S. Cl.
CPC ......... *H04N 9/3114* (2013.01); *H04N 9/3144* (2013.01); *H04N 9/3155* (2013.01); *H04N 9/3161* (2013.01)

(58) Field of Classification Search
CPC .. H04N 9/3144; H04N 9/3114; H04N 9/3155; H04N 9/3161
USPC ..................................................... 353/84, 85
See application file for complete search history.

(56) References Cited

U.S. PATENT DOCUMENTS

| | | | |
|---|---|---|---|
| 2009/0174866 A1* | 7/2009 | Okada | .................... G03B 21/20 353/52 |
| 2010/0060861 A1 | 3/2010 | Medin | |
| 2010/0302515 A1 | 12/2010 | Plut | |

FOREIGN PATENT DOCUMENTS

| | | | |
|---|---|---|---|
| CN | 103097859 A | 5/2013 | |
| CN | 204286642 U | 4/2015 | |
| CN | 104698727 A | 6/2015 | |
| CN | 104836968 A | 8/2015 | |
| EP | 2026127 A1 | 2/2009 | |
| EP | 3121649 A1 | 1/2017 | |
| WO | WO-2012122679 A1 | 9/2012 | |

OTHER PUBLICATIONS

Office Action from Chinese Application No. 201610336598.0 dated Jun. 8, 2017 (7 pages).

\* cited by examiner

APPARATUS AND METHOD FOR CONTROLLING LASER PROJECTOR TO OPERATE

CROSS-REFERENCE TO RELATED APPLICATIONS

This application claims the benefit and priority of Chinese Patent Application No. 201610336688.X filed May 20, 2016, Chinese Patent Application No. 201610336598.0 filed May 20, 2016, and Chinese Patent Application No. 201610344208.4 filed May 20, 2016 The entire disclosures of each of the above applications are incorporated herein by reference.

FIELD

The present disclosure relates to the field of communications, and particularly to an apparatus and method for controlling a laser projector to operate.

BACKGROUND

This section provides background information related to the present disclosure which is not necessarily prior art.

The laser display technologies have brought a totally fresh visual experience to us due to their inherent high color reproducibility, high contrast, high brightness, and other features. At a laser theater, an image is displayed in more sharp colors and at higher brightness as compared with a traditional home theater, where light emitting sources in the laser theater are laser projectors, and these laser source have a long lifetime and high information confidentiality, so the laser theater can better agree with the demand in the market, and the development trend in our age; and also the laser theater is inherently advantageous in terms of fabricating very large screens, and also consumes lower power as compared with a Light Emitting Diode (LED) liquid crystal TV set with the same size, thus agreeing with the demand for energy saving and environment conservation in our society.

The laser theater generally includes a laser projector, an acoustic device, and a screen. The laser projector includes a number of key elements and devices, e.g., a laser diode, a Digital Micro-Mirror Device (DMD) chip, a phosphor wheel, a power source, various electronic chips, etc., and the laser projector is a highly precise and highly integrated opto-mechatronic device. In view of this, it is necessary to detect the operating states of the respective components in the laser projector in operation so as to guarantee normal operation throughout the laser projector system.

SUMMARY

This section provides a general summary of the disclosure, and is not a comprehensive disclosure of its full scope or all of its features.

Embodiments of the disclosure provide an apparatus and method for controlling a laser projector to operate.

Some embodiments of the disclosure provide an apparatus for controlling a laser projector to operate, the apparatus includes:

an obtaining module configured to obtain an operating parameter of the laser projector in operation;

a judging module configured to compare obtained operating parameter with a preset parameter, and to judge whether the laser projector fails, wherein the preset parameter is a parameter of the laser projector which is operating normally; and a determining module to determine failure information of the laser projector according to a result of a comparison if the judging module judges that the failure occurs.

Some embodiments of the disclosure provide a method for controlling a laser projector to operate, the method includes:

obtaining a plurality of operating parameters of the laser projector in operation;

comparing each of obtained operating parameters with a preset parameter, and judging whether the laser projector fails, wherein the preset parameters are parameters of the laser projector which is operating normally; and determining failure information of the laser projector according to a result of a comparison if it is judged that the failure occurs.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
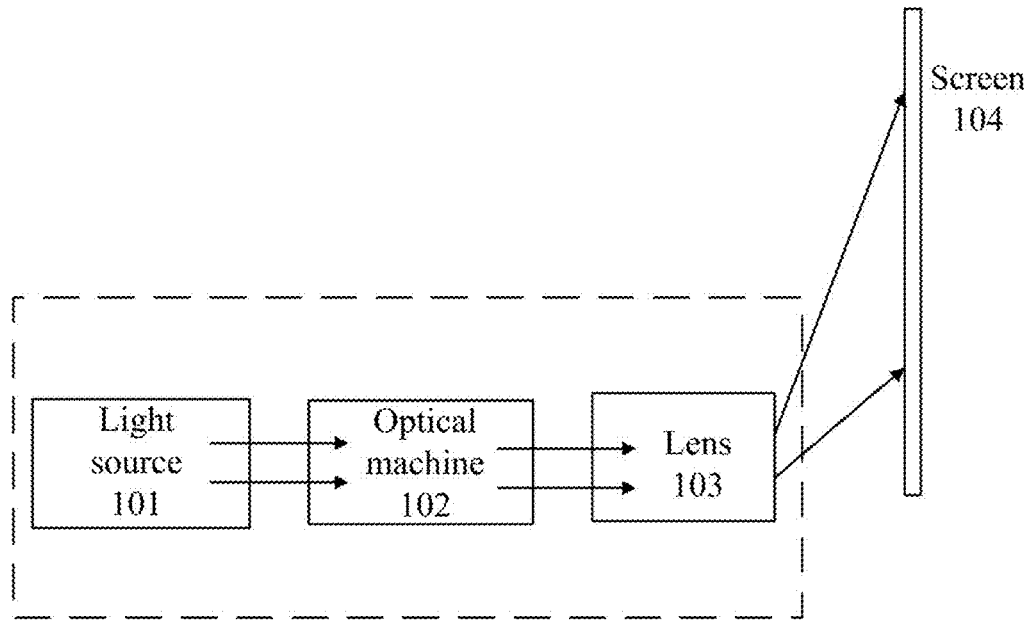
FIG. 1 is a schematic structural diagram of the laser projector in the prior art.

FIG. 1 illustrates a schematic structural diagram of the components in the laser projector in the prior art, which includes a light source 101, an optical machine 102, a lens 103, and a projection screen 104.

Here the light source 101 includes a laser projector and a color wheel, where since there is a limited application scope of purely monochromatic laser projectors, the existing laser source is a monochromatic laser source or a dichromatic laser source, that is, the laser source includes a laser projector emitting one or two colors, and a fluorescence source generating fluorescence as a result of wavelength conversion; and the color wheel includes a fluorescence wheel, or a fluorescence wheel and a color filter wheel, where the fluorescence wheel is excited by the laser to generate such fluorescence corresponding in color to a wavelength converting material that is mixed with the laser emitted by the laser projector into three primary colors RGB. The wavelength of the fluorescence needs to be converted by illuminating a laser spot at high energy onto the surface of the fluorescence wheel, and there is such a lot of heat generated locally on the fluorescence wheel due to the steadily illuminating light beam at the high energy that may even burn through the fluorescence wheel, so the fluorescence wheel is rotated periodically so that there is a circumferential locus of the laser beam at the high energy, and thermal radiation can be facilitated by the rotated fluorescence wheel.

The color filter wheel is arranged in an emergent light path of the fluorescence wheel primarily for the purpose of filtering the fluorescence generated as a result of excitation to improve the purity of the colors, so the color filter wheel is rotated in synchronization with the fluorescence wheel.

The optical machine 102 includes a DMD chip, which is a core element of the DLP projector, including thousands of tiny reflecting mirrors, where the optical machine receives light in the three primary colors provided in sequence provided by the light source, receives a modulated image signal, and reflects a light beam carrying content information of an image by the tiny reflecting mirrors into the lens 103.

The size of the DMD is so small that requires the light beam emitted by the light source to be output both in sequence and at uniform brightness all the time so as to prevent the brightness of the image on the screen from being inconsistent, and the brightness of the light beam emitted from the light source from being attenuated over time, due to which the brightness of the light beam received in the light path of the DMD also varies.

The lens 103 is typically a lens with an ultra-short focus in a home laser projector, and operates as an imager to magnify by a factor and project the light beam reflected by the DMD onto the screen 104 for display, where the light rays are reflected by the screen, and then enters human eyes, so that a watcher sees the projected image.

Figure 2A:
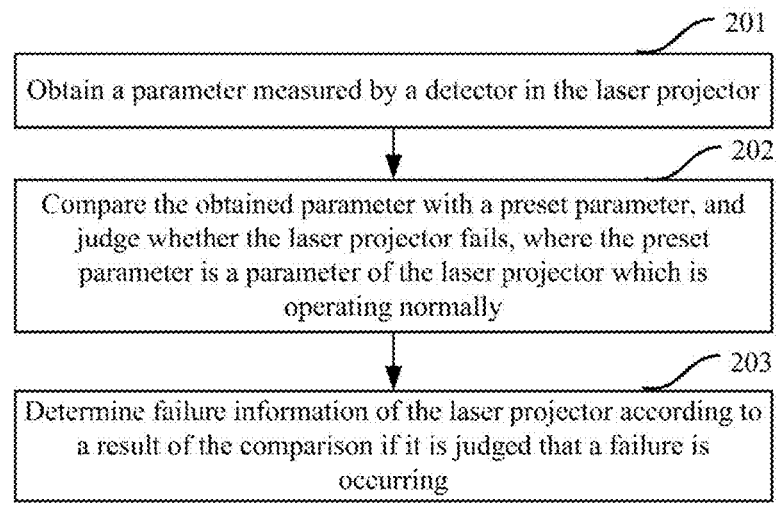
FIG. 2A is a schematic flow chart of a method for controlling a laser projector to operate according to some embodiments of the disclosure.

Further to the introduction of the structural components of the laser projector, an example of a method for controlling a laser projector to operate will be described according to some embodiments of the disclosure with reference to a schematic flow chart of starting the laser projector as illustrated in FIG. 2A.

The flow can be performed in software using the hardware of the laser projector in the following steps:

The step 201 is to obtain an operating parameter of the laser projector in operation.

The step 202 is to compare the obtained operating parameter with a preset parameter, and to judge whether the laser projector fails, where the preset parameter is a parameter of the laser projector which is operating normally.

The step 203 is to determine failure information of the laser projector according to a result of the comparison if it is judged that a failure is occurring.

Optionally the operational flow of the laser projector according to the embodiment of the disclosure as illustrated in FIG. 2A can be performed immediately after the laser projector to which this method is applied is started, for example, after the laser projector receives a start signal of a remote controller, and is started, the step 201 in the operational flow of the laser projector according to the embodiment of the disclosure will be performed immediately. Alternatively this step can be performed periodically on the laser projector in operation using a timer.

In the step 201, the parameter measured by a detector in the laser projector can be obtained in real time, or periodically, or as a result of triggering by the detector in the laser projector after measuring the parameter, or the like. Furthermore alternatively the parameter measured by a detector in the laser projector can be obtained in a priority order which is preset particularly for the parameter detected by the detector in the laser projector.

The operating parameter in the laser projector obtained in the step 201 can include one or more of:

The rotation speed of the color wheel measured by an infrared sensor, temperature measured by the temperature sensor, light brightness measured by a light sensor, driving current of the laser device measured by a current detector, ambient humidity measured by a humidity sensor, the posture at which the laser projector is placed, measured by a gravity sensor, the rotation speed of a fan measured by a fan rotation speed detector, the cleanliness of the laser projector measured by a filter detector, and the state of a protecting cover measured by a protecting cover detector.

Here there are different detection priorities of the various operating parameters, for example, all the priorities of the operating parameters including rotation speed of the color wheel, the driving current of the laser, the rotation speed of the fan, the temperature, and the light brightness are higher than those of the operating parameters including the ambient humidity, the cleanliness of the laser projector, the state of the protecting cover, the motion state of a human body in a preset area of the laser projector, and the posture at which the laser projection is placed; or the operating parameters including the rotation speed of the color wheel, the driving current of the laser projector, the rotation speed of the fan, the temperature, and the light brightness are detected preferentially over the motion state of the human body in the preset area of the laser projector, which is detected preferentially than the ambient humidity of the laser projector, and the cleanliness of the laser projector, and the operating parameter including the state of the protecting cover, and the posture at which the laser projector is placed are detected the least preferentially.

The detection priorities are so different that the operating parameters at the higher priorities are compared preferentially so that the operating states of the components corresponding to the operating parameters can be determined, where higher priority levels are typically preset for the operating parameters of some crucial components, for example, the components including the laser, the color wheel, the fan, etc., are underlying components for guaranteeing the operation of the system, so it is preferentially judged whether the operating parameters corresponding to these components are normal.

As compared with the traditional projector, the two color wheels including the fluorescence wheel and the color filter wheel are applied in the laser projector, where the fluorescence wheel is a wavelength converting component configured to generate from the laser the three primary colors required for the light source, and if the fluorescence fails to operate normally, then the laser striking onto the surface of the stationary color wheel will burn the color wheel, and if the color wheel is struck through instantaneously, then an irreversible loss will be incurred. If the color filter wheel fails to operate normally with the fluorescence wheel, then a signal processing system of the optical machine may be hindered from generating the three primary colors generated in sequence. Accordingly the normally operating color wheel is a crucial component which can enable the light source to convert the wavelength normally to output all the three primary colors. The rotation speed of the color wheel is typically obtained by the infrared sensor. As can be apparent, the rotation speed of the color wheel is one of important parameters to evaluate whether the laser projector is operating normally.

Figure 3:
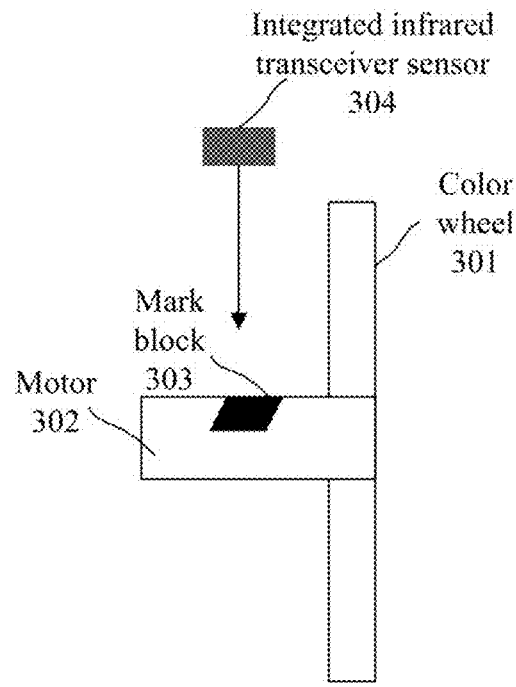
FIG. 3 is a schematic diagram of detecting the rotation speed of a color wheel according to some embodiments of the disclosure.

In some embodiments of the disclosure, the rotation speed of the color wheel measured by the infrared sensor can be obtained in the step 201, where the infrared sensor can particularly be an integrated infrared transceiver sensor. FIG. 3 illustrates an example of measuring the rotation speed of the color wheel, where the color wheel 301 is brought by a motor 302 into rotation; there is such a mark block 303 affixed on the side surface of the motor 302 that is of a black light-absorbing material; the integrated infrared transceiver sensor 304 can receive and transmit probing light; and while the motor 302 is rotating, if the area of the mark block is rotated into the range of the probing light, then the mark block 303 will reflect and absorb the light emitted by the integrated infrared transceiver sensor 304, thus resulting in a pulse waveform, so that the integrated infrared transceiver sensor 304 can determine the rotation speed of the color wheel 301 according to the periodicity of the pulse waveform.

The majority of the elements and devices in the laser projector are so sensitive to the temperature that these crucial elements and devices, and the entire system need to operate under some environmental condition to thereby guarantee their reliability and service lifetimes. For example, if the laser device has been operating at high temperature for a long period of time, then the service lifetime thereof will be shortened; there may be such a local excessive rise of the temperature that the efficiency of rotating the fluorescence wheel may be degraded, and even a plasmatic optical mirror may be deformed, and the light path may fail to work normally; and so on.

In some embodiments of the disclosure, the temperature measured by the temperature sensor can be obtained in the step 201, where there are typically a plurality of temperature sensors arranged in the laser projector, for example, some of the temperature sensors are arranged around the laser device to detect the temperature of the laser device, and some of the temperature sensors are arranged at an air entry to detect the ambient temperature of the laser projector. Furthermore the plurality of temperature sensors in the laser projector can be further numbered respectively so that the differently positioned temperature sensors can be distinguished from each other. In some embodiments of the disclosure, the temperature sensors can be Negative Temperature Coefficient (NTC) thermally-sensitive resistors which can be packaged in various forms to thereby be applied conveniently to various circuits.

In some embodiments of the disclosure, the light brightness measured by the light sensor can be further obtained in the step 201. Light brightness data reflecting the light brightness includes at least brightness data in the light path of illumination of the light machine in the laser device measured by the light sensor to reflect the varying brightness of the light beam in the light path of illumination of the DMD, for example, whether the light source has been attenuated, or a sharp change in brightness of monochromatic light in one of the primary colors due to a damage to some optical component, or the uniformity in brightness of the light beam in the light path. The light brightness data can also include data of light beam brightness on a curved reflecting mirror in front of the projector lens, where the light sensor is typically arranged in an illuminating system of the light machine of the laser projector, for example, in the light path between the color filter wheel and a Digital Micro-Mirror Device (DMD) to detect a change in light brightness to thereby reflect a change in color temperature or white balance, an attenuation condition of the light, etc.

Figure 4:
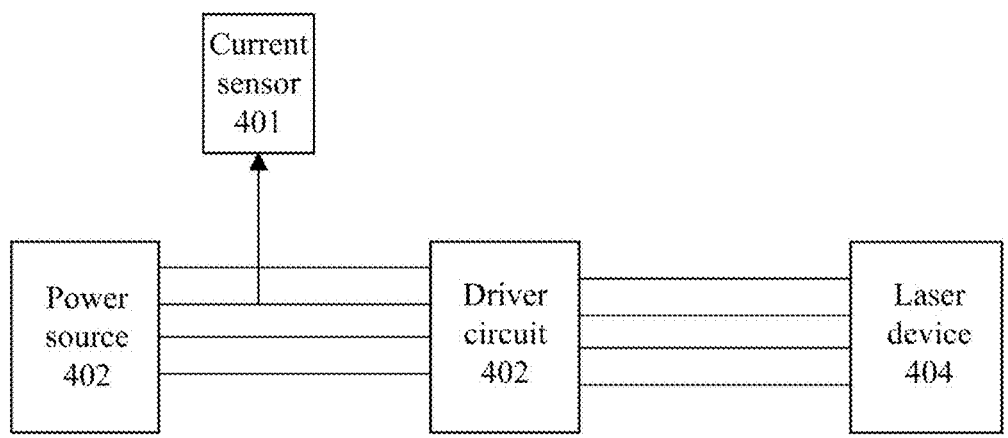
FIG. 4 is a schematic diagram of detecting driving current of a laser according to some embodiments of the disclosure.

In some embodiments of the disclosure, the driving current of the laser device measured by the current detector can be further obtained in the step 201, where the current detecting component can particularly be a current sensor or another feedback circuit. FIG. 4 illustrates an example of measuring the driving current of the laser device, where the current sensor 401 is arranged between a power source 402 and a driving circuit 403, or can be arranged between the driving circuit 403 and the laser device 404; the driving circuit 403 is typically controlled by a Pulse Width Modulation (PWM) wave or a switch circuit to current-drive the laser device 404; and the laser device 404 includes a plurality of groups of laser elements, each of which is a laser bank, e.g., a typically M*N laser array, where the respective laser elements are typically connected in series, so if one of them is damaged, then the group of laser elements will be broken, and fail to emit light normally, thus degrading the brightness of the light source.

In some embodiments of the disclosure, the ambient humidity measured by the humidity sensor can be further obtained in the step 201, where thermal radiation of the laser projector may be affected by the ambient temperature of the laser projector, so the humidity sensor can be arranged at the air entry of the laser projector, etc.

In some embodiments of the disclosure, the posture at which the laser projector is placed, measured by the gravity sensor can be further obtained in the step 201, where the formation of a channel over which the heat of the laser projector is radiated may be affected by the varying posture at which it is placed, and there is also a difference of the speed at which the air is circulated between the channel over which the heat is radiated, and the environment of the outside, so there is typically a better thermal radiation effect of the laser projector which is placed in front projection (or forward) than the thermal radiation effect of the laser projector which is placed in back projection; and the gravity sensor can measure forces applied to the laser projector in the directions of the respective coordinate axes in the space to thereby obtain some original data reflecting the posture at which the laser projector is placed, so as to obtain the posture at which the laser projector is placed, by quantizing the data under a preset quantization rule.

In some embodiments of the disclosure, the rotation speed of the fan measured by the fan rotation speed detector can be further obtained in the step 201, where there are typically a plurality of fans arranged in the laser projector, for example, there is one or more fans arranged at the air entry or the air exit; there is also one or more fans arranged inside a housing in which the light source is accommodated air-tightly to thereby improve the speed at which an air flow is circulated; and there are typically also fans arranged by the sides of a power source board, a driver board, and other boards, a heat sink, and other components, where the fans in the laser projector are typically DC fans, and the fan rotation speed detector can be a circuit component in a circuitry of the fan to feed back the rotation speed of the fan, e.g., a feedback pin.

In some embodiments of the disclosure, parameters measured by some other measuring components can be further obtained in the step 201. For example, if the protecting cover of the projector lens is arranged in the laser projector, then it will be judged upon startup whether the protecting cover has been opened normally; otherwise, the projector will fail to operate normally; and the protecting cover detector can measure the state of the protecting cover, and judge periodically whether the protecting cover has been closed abnormally in operation, for example, the protecting cover has been closed manually. In another example, the cleanliness of the current environment of the laser projector may have an influence upon normal starting of the projector, and a period of time for which the projector has been operating, so the filter detector can measure the cleanliness of the laser projector, and the infrared sensor or the Hall sensor can obtain the motion state of the human body in the preset area of the laser device, for example, if there is extremely high brightness of the laser beam in the specified projection area, then a human body or an animal shall be prevented from entering this area so as to avoid the human body or the animal from being hurt by the high-energy laser beam.

It shall be appreciated that the measuring component in the laser projector can include various sensors, feedback circuits, etc., configured to collect operational information of the devices in the laser projector, and the entire system; and although the parameters measured by some of the detectors in the laser projector are listed in the embodiments of the disclosure, the parameters measured by the measurers in the laser projector will not be limited thereto.

The parameter measured by the detector in the laser projector obtained in the step 201 can be compared with the preset parameter in the step 202 to thereby judge whether the laser projector fails, where the preset parameter is a parameter of the laser projector which is operating normally. Furthermore the preset parameter can be a preset value or range of values of the parameter, and can be preset as needed for the different parameter.

For example, the color wheel shall be brought by the motor into some preset rotation speed or range of rotation speeds in a period of time, e.g., N seconds (N is an integer more than or equal to 1), after the laser projector is started normally, and if the obtained rotation speed of the color wheel does not reach the preset rotation speed (e.g., a preset value of or range of values of the rotation speed), or is significantly different from the preset rotation speed (where there is a preset difference threshold, for example), then it will be judged that the color wheel is operating abnormally, and in this case, the laser projector will fail to be started normally.

In another example, while the laser projector is operating, if the obtained value of the temperature parameter measured by the temperature sensor exceeds the preset value or range of values of the temperature parameter, for example, the measured temperature parameter indicates that the current temperature of the laser projector is too high, then in this case, the projector system shall be stopped from operating in order to prevent the laser projector.

If it is judged that the laser projector fails in the step 202, then failure information of the laser projector will be further determined according to the result of the comparison in the step 202 as described in the step 203.

Here the failure information can particularly be a failure code, and like the majority of devices, corresponding failure codes can be preset in the laser projector to represent different device failures, where the failure code can be a number including digits, e.g., in the form of XX or XXXX, etc. (X represents a digital symbol), and they can be pre-stored in the laser projector, optionally in the form of a table, so that the failure code of the laser projection can be determined by referring to the table according to the result of the comparison in the step 202.

By way of an example, after it is judged that the laser projector fails, if it is judged according to the result of the comparison that the difference between the rotation speed of the color wheel measured by the infrared sensor, and the preset rotation speed of the color wheel exceeds the preset difference threshold, then the failure code corresponding to the rotation speed abnormality of the color wheel, e.g., the digital number 5003, can be obtained by referring to the table of the correspondence relationship between the failure and the failure code, pre-stored in the laser projector; if it is judged according to the result of the comparison that the temperature measured by the temperature sensor configured to measure the operating temperature of the DMD is above the preset temperature, then the failure code corresponding to the temperature abnormality of the DMD, e.g., the digital number 5008, etc., can be obtained by referring to the table of the correspondence relationship between the failure and the failure code, pre-stored in the laser projector.

Figure 2B:
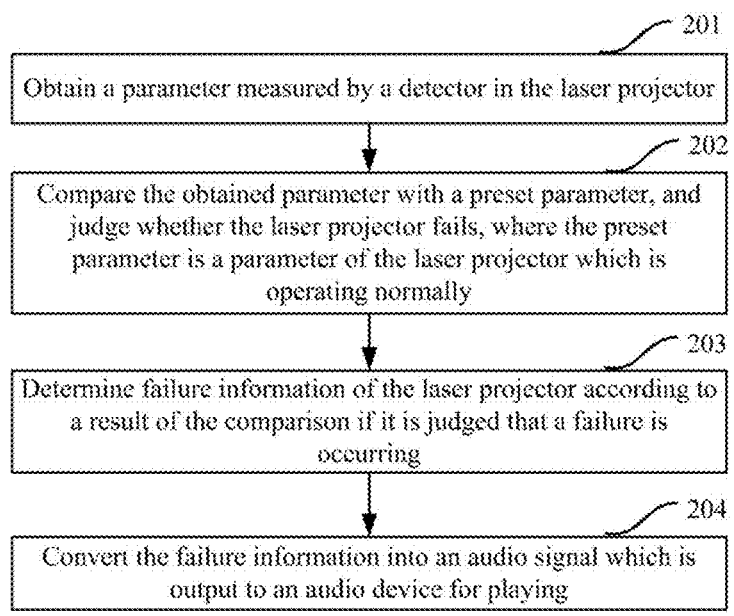
FIG. 2B is a schematic flow chart of another method for controlling a laser projector to operate according to some embodiments of the disclosure.

In some embodiments of the disclosure, after the failure information of the laser projector is judged in the step 203, the step 204 can be further performed as illustrated in FIG. 2B, where the failure information is converted into an audio signal which is output to an audio device for playing.

Figure 6:
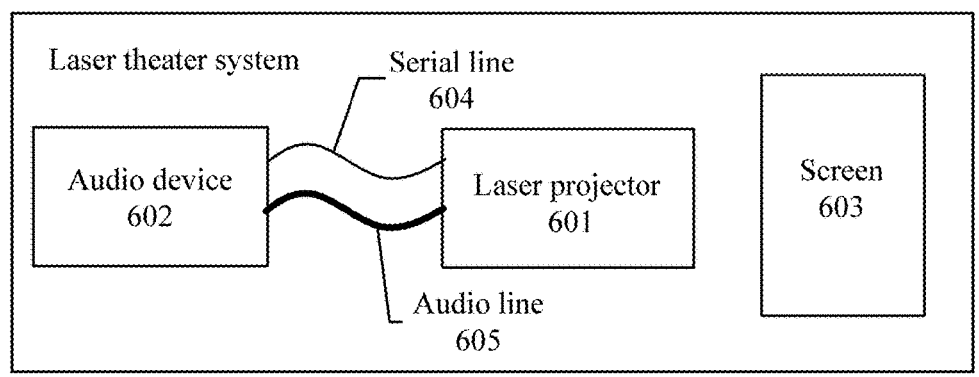
FIG. 6 is another schematic structural diagram of a laser projector according to some embodiments of the disclosure.

Here the audio device can be a sound box device, an audio component, etc. For example, in the structure of a laser theater system as illustrated in FIG. 6, the audio device is a sound box device 602, and a laser projector 601 transmits a command to the sound box device 602 over a serial line 604, for example, to set the volume, to set an acoustic mode, etc., and can an audio signal resulting from conversion to the sound box device 602 over an audio line 605 for playing.

Optionally the failure information can be converted into the audio signal by invoking a text to speech converter integrated in the system of the laser projector, for example, in some embodiments of the disclosure, the failure information can be preferably converted into the audio signal using a TTS application based upon Text To Speech (TTS) software.

Figure 5:
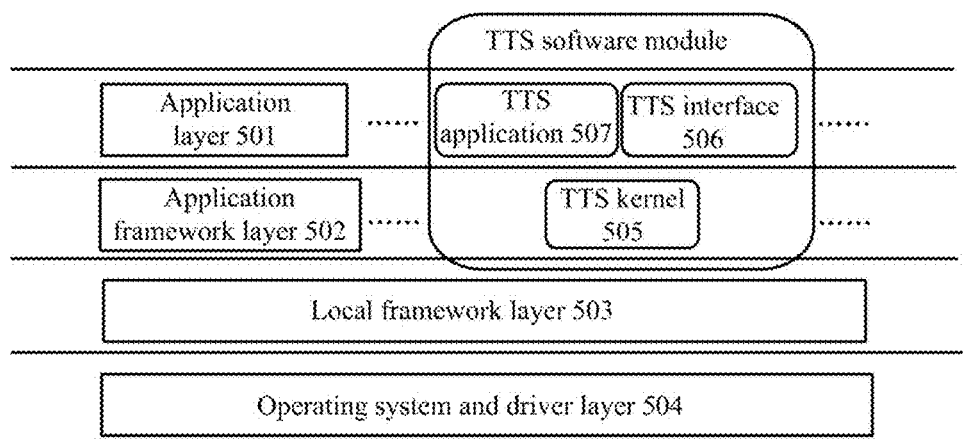
FIG. 5 is a schematic structural diagram of a TTS software application according to some embodiments of the disclosure.

Here the TTS software can be third-party software for which speech synthesis is a key technology. FIG. 5 illustrates the arrangement of the TTS software in the architecture of a software system, where the software system includes an application layer 501, an application framework layer 502, a local framework layer 503, and an operating system and driver layer 504. As illustrated in FIG. 5, modules of the TTS software generally includes a TTS kernel 505 at the application framework layer 502, and a TTS interface 506 at the application layer 501, where a TTS application implemented based upon the modules of the TTS software can invoke the TTS interface 506 to convert a text into a speech using the functions of the TTS software. In the embodiments of the disclosure, the TTS software can be integrated and embedded into the software of the entire laser projector to thereby provide the TTS application configured to convert the failure information into the speech audio signal, where the application can invoke the TTS interface to thereby convert the failure information into the audio signal using the speech synthesis and conversion functions of the TTS software. Furthermore as the TTS technology to convert a text into a speech gradually becomes matured, the TTS application provided in some particular embodiments of the disclosure can be further extended flexibly, for example, it can be extended for a support of versions in a number of languages, that is, a support of conversion into the languages, to thereby convert the failure information into the audio signal in the respective language versions according to a geographical environment and a user setting, thus making it easy to maintain and extend.

In some embodiments of the disclosure, the failure information determined in the step 203 can be a failure code, so that in the step 204, a text corresponding to the failure code can be further determined according to the determined failure code, and further converted into an audio signal, where the text corresponding to the failure code can be a preset set of text symbols to represent the details of the failure corresponding to the failure code; or in some embodiments of the disclosure, the determined failure code can be converted directly into an audio signal in the step 204.

Here in some embodiments of the disclosure, the text can be converted into the audio signal, or the failure code can be converted into the audio signal, by invoking the text to speech converter.

Optionally by way of an example in which the text to speech converter is a TTS application, if the laser projector fails, then the TTS application will be triggered to be invoked at the background, and the TTS application will convert the failure code directly into a speech audio signal which is output to the audio device for playing, so that the user can determine the type of the failure, or the details of the failure, of the laser projector, for example, by referring to a maintenance manual, etc., according to the played failure code; or the TTS application can pre-store therein the details of the failures corresponding to the respective failure codes, so that the details of the failure corresponding to the failure code can be obtained according to the failure code, that is, the failure code can be translated into a particular text, and then the details of the failure can be converted into the speech audio signal to be played by the audio device, by invoking the text to speech conversion function of the TTS application; or the TTS application can pre-store therein information about service hotlines, designated service sites, etc., provided by a manufacturer of the laser projector, so that after the audio signal of the failure code, or the details of the failure is played, an audio signal related to the service information can be further played.

As can be apparent, in the embodiments of the disclosure, the operating parameters of the laser projector in operation are obtained and compared with the preset parameters, and the different detection priorities are preset for the different operating parameters so that the operating states of the important components of the projector can be determined preferentially, thus significantly guaranteeing the normal operation of the laser projector. It is judged whether the laser projector fails, and if so, then the failure information of the laser projector will be determined according to the result of the comparison to thereby get timely knowledge of the operating condition of the laser projector, and furthermore the failure information will be converted into the audio signal which is output to the audio device for playing, so that if the device fails, then the failure information will be indicated in a timely and efficient manner by playing the speech, thus positioning rapidly and getting rid of the failure of the device in a timely manner, and improving the operational reliability of the laser projector.

The user can know the reason of the failure intuitively and intelligently for a better experience of the user. Also in some embodiments of the disclosure, the text to speech converter implemented based upon the TTS software can further support a number of languages to thereby facilitate extensibility and maintenance.

In some embodiments of the disclosure, after the failure information of the laser projector is judged in the step 203, a protection strategy corresponding to the determined failure information of the laser projector can be further retrieved according to the failure information, and furthermore the laser projector can be protected under the retrieved protection strategy to thereby improve the reliability of the laser projector, where the protection strategy corresponding to the failure information may vary with the varying failure information.

Optionally after it is judged that the laser projector fails (i.e., becomes abnormal), according to the parameter detected by the detector arranged in the laser projector, in order to protect the projector from being interrupted, a protection process on the projector can be initiated, for example, the laser is disabled, the color wheel is stopped from being rotated, the light machine is disabled, etc. Optionally the protection strategy corresponding to the determined failure information of the laser projector can be retrieved according to the failure information, and furthermore the laser projector can be protected under the retrieved protection strategy, where the protection strategy can be preset for the different failure information, for example, corresponding failure levels can be preset for the different failure information, so that corresponding protection measures can be preset for the respective failure levels. For example, if the failure information indicates that only a light sensor in the laser projector fails to operate normally, so that a change in brightness of the light source can not be fed back in a timely manner, but the projector system can operate for projection without being affected, then this will indicate that there is such a protection strategy corresponding to the failure information that only produces an audible alert without disabling those components of the laser projector which are operating normally (e.g., the laser device, the color wheel, etc.)

Figure 7:
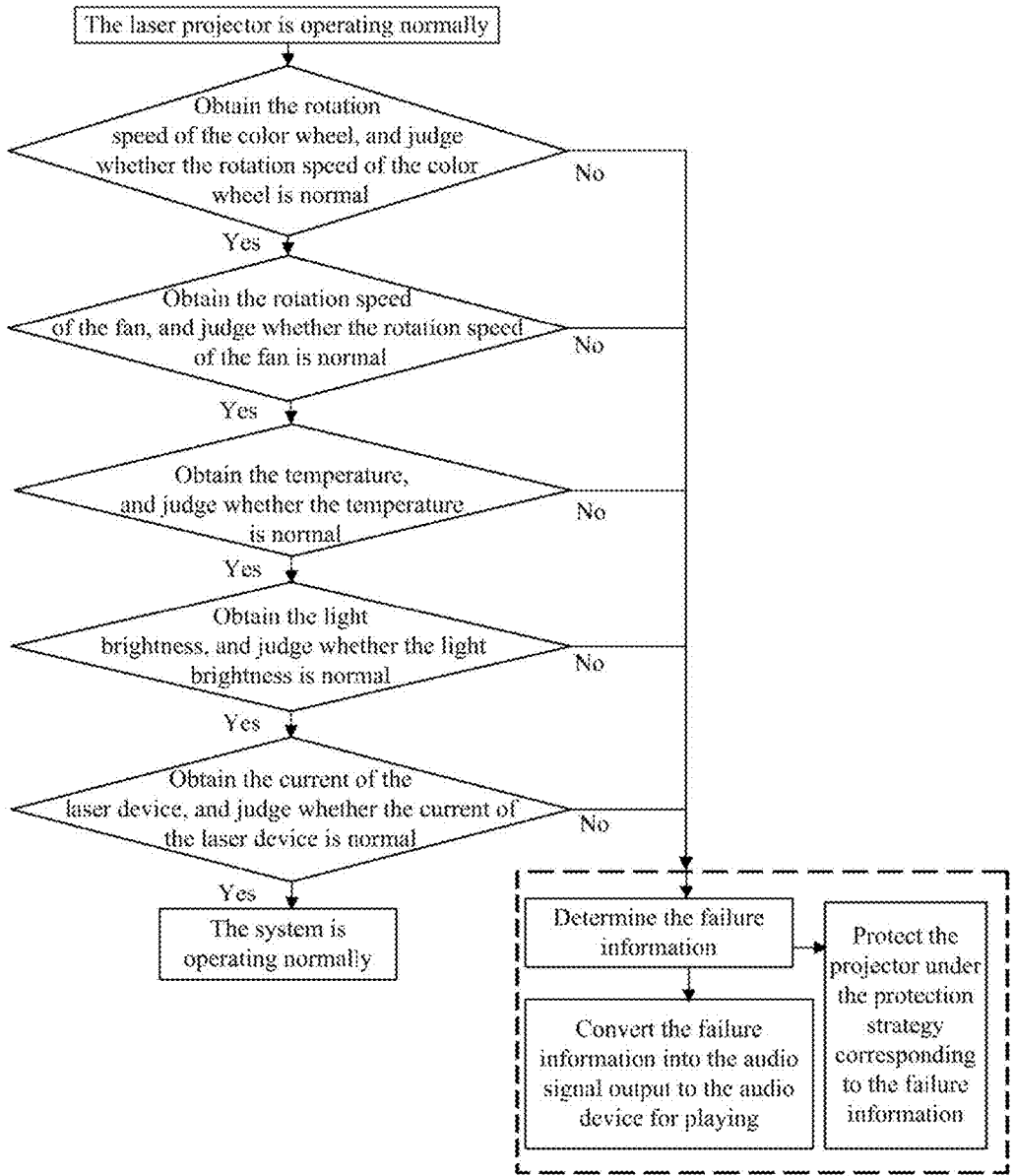
FIG. 7 is a schematic flow chart of another method for controlling a laser projector to operate according to some embodiments of the disclosure.

In order to describe the method for controlling a laser projector to operate according to the embodiments of the disclosure more clearly, an application of the laser projector in operation according to the embodiments of the disclosure will be described below by way of an example in connection with the flow of the method as illustrated in FIG. 7.

As illustrated in FIG. 7, while the laser projector is operating, a laser projector failure alerting device enabling the laser projector according to the embodiments of the disclosure to operate can obtain the rotation speed of the color wheel measured by the infrared sensor, and judge whether the color wheel is operating normally; obtain the rotation speed of the fan measured by the fan rotation speed detector (e.g., the rotation speed of the fan fed back by the feedback pin of the fan system), and judge whether the fan system is operating normally; obtain the temperature measured by the temperature sensor, and judge whether there is normal thermal radiation of the projector, and the components of the projector are operating normally; obtain the light brightness measured by the light sensor, and judge whether there is normal light brightness in the projector; obtain the driving current of the laser device measured by the current detector, and judge whether the group of laser elements is normally driven to emit light; and so on.

If all the detection results of the components inside the fan system, the color wheel system, the temperature sensor, the light sensor, the laser device, etc., indicate normal operation thereof, then the system will keep on operating normally; and if any one of them becomes abnormal, then the failure will be handled, by determining the failure information, converting the failure information into the audio signal, outputting the audio signal to the audio device for playing, and protecting the component according to the protection measure corresponding to the failure information, for example, disabling the laser device, the color wheel, the fan, etc.

It shall be noted that only an example of obtaining and detecting an operating parameter has been described in this embodiment, but the order in which the respective operating parameters are detected can be adjusted, or the periodicity at which the respective operating parameters are detected can be adjusted, according to the different operating states and characteristics of the laser projector.

Furthermore the cleanliness of the filter, the ambient humidity, or whether there is a human body approaching the projection area as detected by the sensor can be further detected and compared in addition to the operating parameters above, according to the operating state of the laser projector, where the cleanliness of the filter can be detected at a long preset detection periodicity, and whether there is a human body approaching the projection area, at a short preset detection periodicity, i.e., frequently, so that such a timely alert can be produced that the human body shall be avoided from being illuminated by the high-energy laser, and particularly the eyes shall be avoided from watching it directly, thus improving the reliability and security of the laser projector in operation.

As can be apparent from the description above, in the technical solution to the laser projector operating according to the embodiments of the disclosure, the parameters measured by the detectors in the laser projector are obtained and compared with the preset parameters, and the different operation parameters are determined and compared at their different priorities in sequence, for example, so that the operating states of the crucial components can be detected, the failure can be handled, and the protection measure can be taken on the projector, in a timely manner to thereby guarantee the reliability of the laser projector in operation.

With the technical solution to the laser projector operating according to the embodiments of the disclosure, for the systematically complex, highly precise, and highly integrated laser projector including a large number of components (fans, color wheels, sensors, etc.,), the operating states of the components, particularly the crucial components can be obtained, the failure can be determined, and the protection measure can be taken on the projector, in a timely manner, for example, after the failure information is judged, the detailed failure information can be converted using the speech synthesis technology into the speed audio signal which is output, so that the technical personal can position rapidly the failure of the projector, shorten the period of time for troubleshooting, and take the corresponding protection measure on the projector so as to alleviate a further damage possibly arising from the failure of the projector, or to improve the security of the projector in use.

Moreover in order to bring the laser projector into operation, it is necessary to start the projector. The laser projector will be controlled to be started, in the method for controlling a laser projector to operate according to the embodiments of the disclosure in the following flow:

receiving a startup instruction;

obtaining at least two of the following operating parameters in the laser projector: the rotation speed of the color wheel, the rotation speed of the fan, the temperature of the projector, the light brightness data, and the state of the protecting cover, where there are different detection priorities of the operating parameters;

judging whether an operating parameter at a higher priority is abnormal, if yes, then initiating a startup protection strategy;

If the operating parameter at the higher priority is normal, then further judging an operating parameter at an immediately lower priority;

If the operating parameter at the immediately lower priority is abnormal, then initiating the startup protection strategy;

If the operating parameter at the immediately lower priority is normal, then further judging the next operating parameter until all the parameters are judged; and If it is judged that all the operating parameters are normal, then lightening the laser device.

The laser projector will be controlled to be started in the method for controlling a laser projector to operate according to the embodiments of the disclosure, in which all the operating parameters above are obtained, in the following flow as described below in details with reference to FIG. 8 by way of an example.

Figure 8:
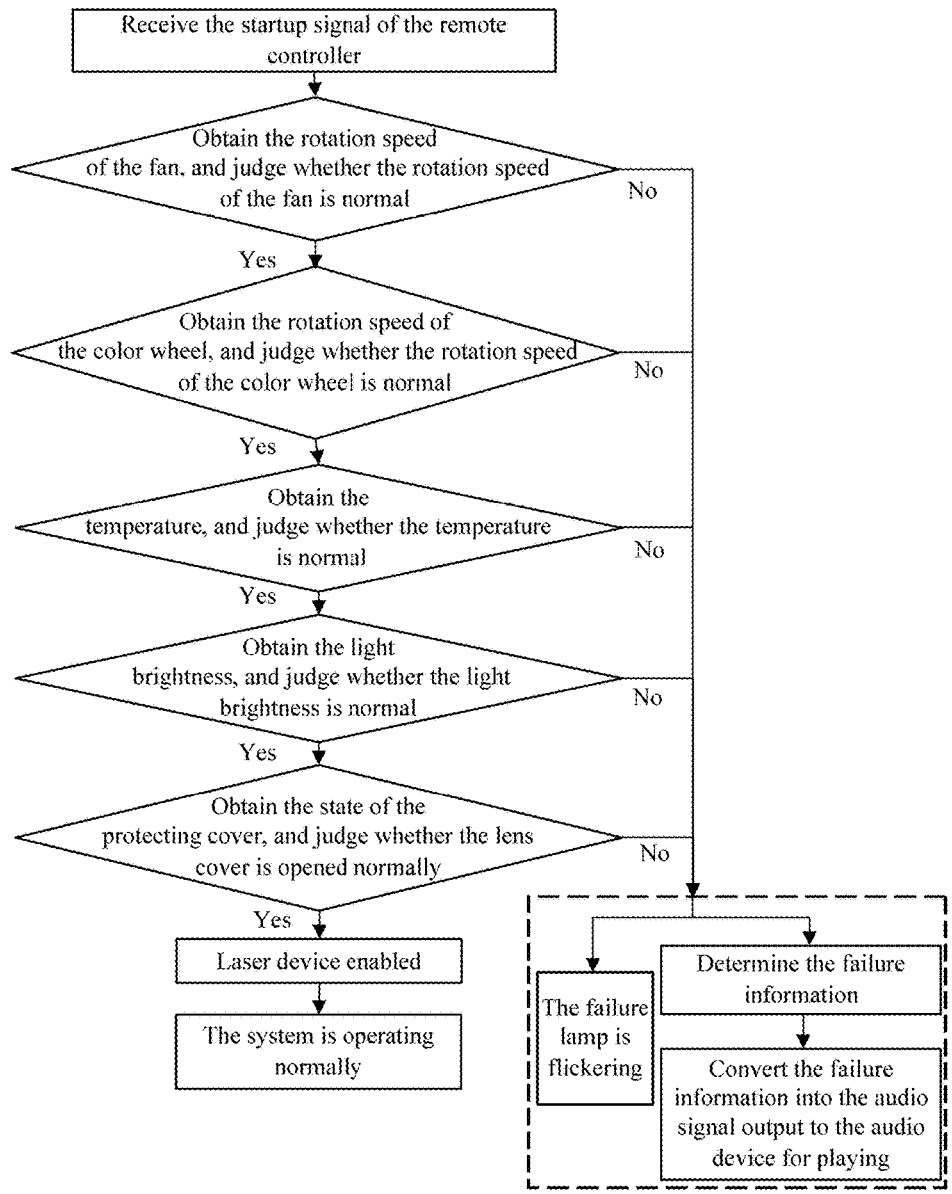
FIG. 8 is a flow chart of controlling a laser projector to be started, in a method for controlling a laser projector to operate according to some embodiments of the disclosure.

As illustrated in FIG. 8, the laser projector is started upon reception of the startup signal of the remote controller. The laser projector failure alerting device enabling the laser projector according to the embodiments of the disclosure to operate can obtain the rotation speed of the fan measured by the fan rotation speed detector, the rotation speed of the color wheel measured by the infrared sensor, the temperature measured by the temperature sensor, the light brightness measured by the light sensor, and the state of the protecting cover measured by the protecting cover detector, and further judge whether the rotation speed of the fan, the rotation speed of the color wheel, the temperature, and the light brightness are normal, and the state of the protecting cover is opened to thereby judge whether the fan system, the color wheel system, the temperature sensor, and the light sensor are started normally, and the lens cover is opened normally. As illustrated in FIG. 8, the parameters above can be obtained sequentially, where the fan, the color wheel, the temperature sensor, the light sensor, and the lens cover can be detected in any other order as appropriate, or concurrently, but their parameters shall be obtained, and their respective failures shall be detected, before the laser device is enabled. If all the fan system, the color wheel system, the temperature sensor, and the light sensor are started normally, and the lens cover is opened normally, then the laser device will be started, so that the system will start to operate normally; and if any one of them becomes abnormal, then the failure will be handled, a failure lamp will be flicking, and the failure information will be determined and converted into the audio signal which is output to the audio device for playing.

Furthermore alternatively, firstly the rotation speed of the color wheel, secondly the rotation speed of the fan, and thirdly the temperature parameter can be obtained in that order, that is, firstly the color wheel system, secondly the fan system, and thirdly the temperature sensor can be detected, according to their priorities or importance levels.

In some embodiments, further to the description above of the importance of the rotation speed of the color wheel, firstly the rotation speed of the color wheel can be obtained to thereby judge whether the color wheel system is operating normally, and if not, then the laser device of the laser projector will not be started. Furthermore if the fan fails to be started normally, then after the projector has been operating for a period of time, the temperature of the projector will become too high because heat can not be dissipated from the projector, so that the components inside the projector may be damaged, and also the projector may be stopped due to a temperature alarm, and thus fail to be accessed normally. In view of this, the rotation speed of the fan can be obtained preferentially over the temperature parameter.

Figure 9:
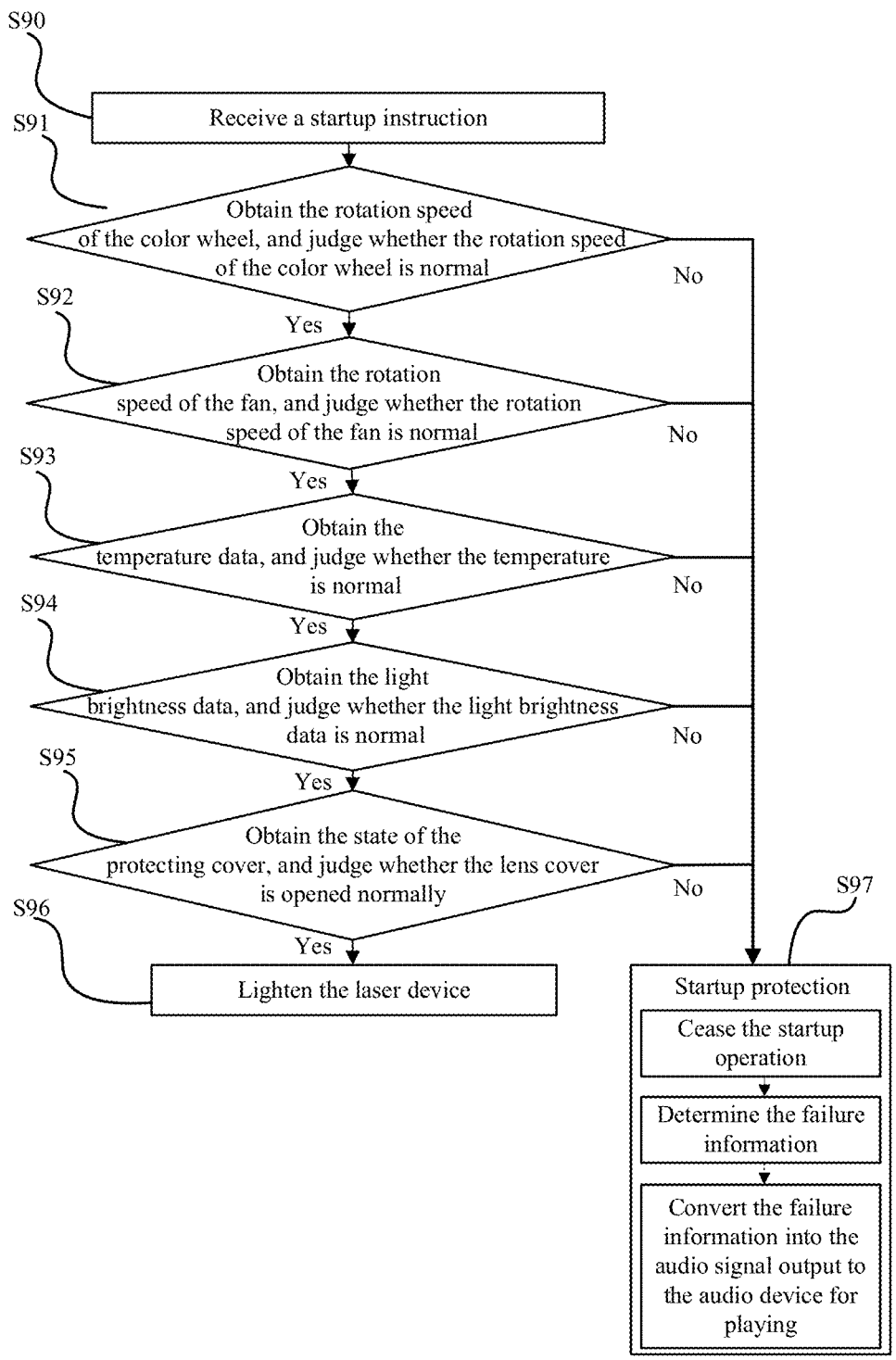
FIG. 9 is a schematic diagram of an exemplary flow chart of controlling a laser projector to be started, in a method for controlling a laser projector to operate according to some embodiments of the disclosure.

In order to facilitate understanding of the flow of controlling the laser projector to be started in the method for controlling a laser projector to operate according to the embodiment of the disclosure, FIG. 9 illustrates an example of the flow in which the laser projector is started into operation. As illustrated in FIG. 9, the flow includes the following steps:

The step S90 is to receive a startup instruction.

The step S91 is to obtain the rotation speed of the color wheel, to judge whether the rotation speed of the color wheel is normal, and if not, to proceed to the step S97 in which startup protection is initiated.

The step S97 includes the following sub-steps:

Pausing the startup operation;

Determining the failure information; and

Converting the failure information into the audio signal, and outputting the audio signal to the audio device for playing.

Otherwise, that is, if it is normal, to proceed to the step S92.

The step S92 is to obtain the rotation speed of the fan, and to judge whether the rotation speed of the fan is normal.

If not, to proceed to the step S97.

Otherwise, that is, if it is normal, to proceed to the step S93.

The rotation speed of the fan can be obtained, as described in the embodiments above, through the feedback pin in the fan driver circuit, so a repeated description thereof will be omitted here.

The step S93 is to obtain the temperature data, to judge whether the temperature is normal, and if not, to proceed to the step S97.

Otherwise, that is, if it is normal, to proceed to the step S94 in which the light brightness data is obtained, and it is judged whether the light brightness data is normal.

Otherwise, to proceed to the step S97.

Otherwise, that is, if it is normal, to proceed to the step S95 in which the state of the protecting cover is obtained, and it is judged whether the protecting cover of the lens is opened normally.

The temperature data, the light brightness data, and the state of the protecting cover can be detected and compared as described above in the embodiments of the disclosure, so a repeated description thereof will be omitted here.

Otherwise, to proceed to the step S97.

Or it is normal, to proceed to the step S96 in which the laser device is lightened.

After it is judged in the step S95 that the range of the data is normal, the ambient humidity of the laser projector, or the cleanliness of the filter can be further obtained, it can be judged whether the ambient humidity, or the cleanliness of the filter lies in the normal range of values, and if not, to proceed to the step S97.

If it is normal, to lighten the laser device as a result.

Figure 10:
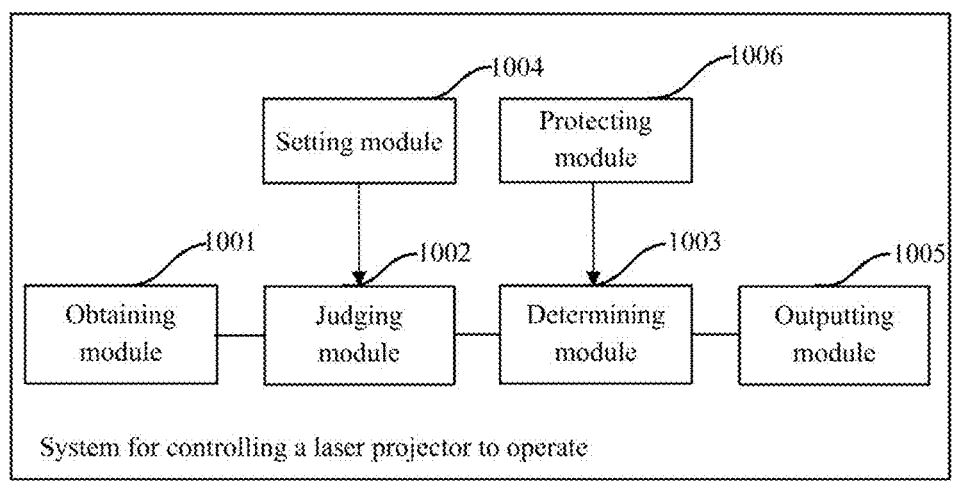
FIG. 10 is a schematic structural diagram of a system for operating a laser projector according to some embodiments of the disclosure.

Based upon the same technical idea, some embodiments of the disclosure further provide a system for controlling a laser projector to operate, where the system can implement the embodiments above of the laser projector being operating, and the system can be applicable to the laser projector, and can obtain the parameters detected by the detectors in the laser projector. FIG. 10 illustrates a schematic structural diagram of the system for controlling a laser projector to operate according to the embodiment of the disclosure, where the system includes:

An obtaining module 1001 is configured to obtain an operating parameter of the laser projector in operation;

A judging module 1002 is configured to compare the operating parameter obtained by the obtaining module 1001 with a preset parameter, and to judge whether the laser projector fails, where the preset parameter is a parameter of the laser projector which is operating normally; and A determining module 1003 is to determine failure information of the laser projector according to a result of the comparison if the judging module 1002 judges that the failure occurs;

Here the operating parameter, measured by a detector in the laser projector, obtained by the obtaining module 1001 includes one or more of:

The rotation speed of a color wheel measured by an infrared sensor, temperature measured by a temperature sensor, light brightness measured by a light sensor, driving current of a laser device measured by a current detector, ambient humidity measured by a humidity sensor, the posture at which the laser projector is placed, measured by a gravity sensor, the rotation speed of a fan measured by a fan rotation speed detector, the cleanliness of the laser projector measured by a filter detector, and the state of a protecting cover measured by a protecting cover detector.

Furthermore the system for controlling a laser projector to operate as illustrated in FIG. 10 can further include:

A setting module 1004 is configured to preset the detection priorities of the operating parameters; and an outputting module 1005 is configured to convert the failure information determined by the determining module 1003 into an audio signal, and to output the audio signal to an audio device for playing.

Here the failure information can be a failure code.

The outputting module 1005 can be configured to determine a text corresponding to the failure code according to the failure code, and to convert the text into the audio signal; or to convert the failure code into the audio signal.

The outputting module 1005 can be configured to convert the text into the audio signal, or to convert the failure code into the audio signal, by invoking a text to speech converter.

The outputting module 1005 can be further configured to include the audio device configured to output the speech signal.

Furthermore the system for controlling a laser projector to operate further includes a protecting module 1006 configured to retrieve a protection strategy corresponding to the failure information of the laser projector determined by the determining module 1003 according to the failure information; and to protect the laser projector under the retrieved protection strategy.

Furthermore if the laser projector is to be started, then the obtaining module 1001 can be further configured to receive a startup instruction, and to obtain at least two of the following operating parameters in the laser projector: the rotation speed of the color wheel, the rotation speed of the fan, the temperature of the projector, the light brightness data, and the state of the protecting cover, where there are different detection priorities of the operating parameters;

The judging module 1002 is configured to compare an operating parameter at a higher priority with a preset parameter, to judge whether the operating parameter at the higher priority is normal, and if so, to further judge an operating parameter at an immediately lower priority until all the parameters are judged; and The determining module 1003 is configured to initiate the startup protection strategy when the judging module 1002 judges that the operating parameter is abnormal; and to decide to lighten the laser device when the judging module 1002 judges that all the operating parameters are normal.

Based upon the same technical idea, some embodiments of the disclosure further provide an apparatus for controlling a laser projector to operate, where the apparatus can implement the embodiments above of the laser projector being operating, and the apparatus can be applicable to the laser projector, and can obtain the parameters detected by the detectors in the laser projector. The apparatus includes a memory configured to store computer readable instructions and at least one processor, wherein the at least one processor is configured to execute the computer readable instructions to:

obtain an operating parameter of the laser projector in operation;

compare the obtained operating parameter with a preset parameter, and to judge whether the laser projector fails, wherein the preset parameter is a parameter of the laser projector which is operating normally; and determine failure information of the laser projector according to a result of a comparison when the judging module judges that a failure occurs.

In some embodiments, the at least one processor is further configured to execute the computer readable instructions to:

before the laser projector is started, and a laser device of the laser projector is lightened, obtain at least two of the following operating parameters in the laser projector: rotation speed of a color wheel, rotation speed of a fan, temperature of the projector, and light brightness data, wherein there are different detection priorities of the operating parameters;

compare an operating parameter at a higher priority with a preset parameter, to judge whether the operating parameter at the higher priority is normal, and if so, to further compare an operating parameter at an immediately lower priority until all the parameters are compared at their detection priorities; and cease a startup operation, to determine that the laser projector fails, and output the failure information, when it is judged that the operating parameter is abnormal; and decide to lighten the laser device when it is judged that all the operating parameters are normal.

In some embodiments, the at least one processor is further configured to execute the computer readable instructions to:

set the detection priorities of the operating parameters;

wherein the operating parameters in the laser projector comprise at least two of:

rotation speed of a color wheel measured by an infrared sensor, temperature measured by a temperature sensor, light brightness measured by a light sensor, driving current of a laser device measured by a current detector, rotation speed of a fan measured by a fan rotation speed detector, cleanliness of the laser projector measured by a filter detector, state of a protecting cover measured by a protecting cover detector, ambient humidity measured by a humidity sensor, posture at which the laser projector is placed, measured by a gravity sensor, and motion state of a human body in a preset area of the laser device.

In some embodiments, the at least one processor is further configured to execute the computer readable instructions to:

set the detection priorities of the operating parameters, wherein the rotation speed of the color wheel, or the rotation speed of the fan is set with the highest detection priority.

In some embodiments, the at least one processor is further configured to execute the computer readable instructions to:

set the detection priorities of the operating parameters, wherein both the detection priorities of the rotation speed of the color wheel, and the rotation speed of the fan are set higher than the detection priorities of the temperature data and the light brightness data.

In some embodiments, the at least one processor is further configured to execute the computer readable instructions to:

set the detection priorities of the operating parameters;

wherein the operating parameters of the laser projector further comprise state of a protecting cover of a lens, ambient humidity of the laser projector, and cleanliness of a filter; and the at least one processor is further configured to execute the computer readable instructions to:

set the lowest detection priorities for the ambient humidity of the laser projector, and the cleanliness of the filter.

In some embodiments, the at least one processor is further configured to execute the computer readable instructions to:

convert the failure information into an audio signal, and output the audio signal to an audio device for playing.

In some embodiments, the failure information is a failure code;

wherein the at least one processor is further configured to execute the computer readable instructions to:

determine a text corresponding to the failure code according to the failure code, and to convert the text into the audio signal; or convert the failure code into the audio signal.

In some embodiments, the at least one processor is further configured to execute the computer readable instructions to:

retrieve a protection strategy corresponding to the failure information of the laser projector determined by the determining module according to the failure information; and protect the laser projector under the retrieved protection strategy.

The system/apparatus for controlling a laser projector to operate according to the embodiments of the disclosure performing the method in the flow according to the embodiments above can obtain the operating parameters of the laser projector in operation, compare the obtained operating parameters with the preset parameters, and judge whether the laser projector fails; and if so, then the system/apparatus will determine the failure information of the laser projector according to the result of the comparison, and can get timely knowledge of the operating condition of the laser projector, and handle the abnormal failure thereof in a timely manner to thereby improve the reliability of the laser projector in operation. The failure information is converted into the audio signal, and the audio signal is output to the audio device for playing, so that if the projector fails, then the failure information can be indicated efficiently by playing the speech, thus positioning rapidly and getting rid of the failure of the projector in a timely manner, and also improving the reliability of the laser projector in operation.

If these technologies are implemented in software, then they can be implemented in modules configured to perform the functions described here (e.g., programs, functions, etc.). The software codes can be stored in a memory, and executed by a processor. The memory can reside inside or outside the processor.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An apparatus for controlling operation of a laser projector, the apparatus comprising:
a memory configured to store computer readable instructions; and
at least one processor configured to execute the computer readable instructions to:
during a startup operation of the laser projector and before a laser device of the laser projector is lightened, obtain at least two of the following operating parameters of the laser projector: rotation speed of a color wheel, rotation speed of a fan, temperature of the laser projector, and light brightness data, different ones of the operating parameters having different detection priorities;
compare one of the obtained operating parameters at a higher priority with a preset parameter to determine whether the operating parameter at the higher priority is normal, the preset parameter indicative of normal operation of the laser projector;
in response to determining that the operating parameter at the higher priority is normal, successively compare other ones of the obtained operating parameters at immediately lower priorities until all of the obtained operating parameters are compared according to their detection priorities;
in response to determining that any of the obtained operating parameters are abnormal, cease the startup operation, determine that the laser projector has failed, and output failure information; and
lighten the laser device in response to determining that all of the obtained operating parameters are normal.

2. The apparatus according to claim 1, wherein the at least one processor is further configured to execute the computer readable instructions to:
set the detection priorities of the operating parameters;
wherein the rotation speed of the color wheel is measured by an infrared sensor, the temperature is measured by a temperature sensor, the light brightness is measured by a light sensor, or the rotation speed of the fan is measured by a fan rotation speed detector, and the obtained operating parameters further include at least one of a driving current of the laser device measured by a current detector, a cleanliness of the laser projector measured by a filter detector, a state of a protecting cover measured by a protecting cover detector, an ambient humidity measured by a humidity sensor, a posture at which the laser projector is placed measured by a gravity sensor, and a motion state of a human body in a preset area of the laser device.

3. The apparatus according to claim 1, wherein the at least one processor is further configured to execute the computer readable instructions to:
set the detection priorities of the operating parameters, wherein the rotation speed of the color wheel or the rotation speed of the fan is set with a highest detection priority.

4. The apparatus according to claim 1, wherein the at least one processor is further configured to execute the computer readable instructions to:
set the detection priorities of the operating parameters, wherein the detection priorities of the rotation speed of the color wheel and the rotation speed of the fan are each set higher than the detection priorities of the temperature and the light brightness data.

5. The apparatus according to claim 1, wherein the at least one processor is further configured to execute the computer readable instructions to:
set the detection priorities of the operating parameters, wherein the operating parameters of the laser projector further include a state of a protecting cover of a lens, an ambient humidity of the laser projector, and a cleanliness of a filter; and set lowest detection priorities for the ambient humidity of the laser projector and the cleanliness of the filter.

6. The apparatus according to claim 1, wherein the at least one processor is further configured to execute the computer readable instructions to:

convert the failure information into an audio signal, and output the audio signal to an audio device for playing.

7. The apparatus according to claim 6, wherein:

the failure information includes a failure code; and the at least one processor is further configured to execute the computer readable instructions to:

determine a text corresponding to the failure code according to the failure code, and to convert the text into the audio signal; or convert the failure code into the audio signal.

8. The apparatus according to claim 1, wherein the at least one processor is further configured to execute the computer readable instructions to:

retrieve a protection strategy corresponding to the failure information of the laser projector; and protect the laser projector according to the retrieved protection strategy.

9. A method for controlling operation of a laser projector the method comprising:

during a startup operation of the laser projector and before a laser device of the laser projector is lightened, obtaining at least two of the following operating parameters of the laser projector: rotation speed of a color wheel, rotation speed of a fan, temperature of the laser projector, and light brightness data, different ones of the operating parameters having different detection priorities;

comparing one of the obtained operating parameters at a higher priority with a preset parameter to determine whether the operating parameter at the higher priority is normal, the preset parameter indicative of normal operation of the laser projector;

in response to determining that the obtained operating parameter at the higher priority is abnormal, ceasing a startup operation, determining that the laser projector has failed, and outputting failure information;

in response to determining that the obtained operating parameter at the higher priority is normal, comparing another one of the obtained operating parameters at an immediately lower priority;

in response to determining that the obtained operating parameter at the immediately lower priority is abnormal, ceasing the startup operation, determining that the laser projector has failed, and outputting the failure information;

in response to determining that the obtained operating parameter at the immediately lower priority is normal, successively comparing other one(s) of the operating parameters at a next immediately lower priority until all of the obtained operating parameters are compared according to their detection priorities; and in response to determining that all of the obtained operating parameters are normal, lightening the laser device.

10. The method according to claim 9, wherein the rotation speed of the color wheel or the rotation speed of the fan is set with a highest detection priority.

11. The method according to claim 9, wherein the detection priorities of the rotation speed of the color wheel and the rotation speed of the fan are each set higher than the detection priorities of the temperature and the light brightness data.

12. The method according to claim 9, wherein:

the operating parameters of the laser projector further include a state of a protecting cover of a lens, an ambient humidity of the laser projector, and a cleanliness of a filter; and the ambient humidity of the laser projector and the cleanliness of the filter are set with lowest detection priorities.

13. The method according to claim 9, wherein the rotation speed of the color wheel is measured by an infrared sensor, the temperature is measured by a temperature sensor, the light brightness is measured by a light sensor, or the rotation speed of the fan is measured by a fan rotation speed detector, and the obtained operating parameters further include at least one of a driving current of the laser device measured by a current detector, a cleanliness of the laser projector measured by a filter detector, a state of a protecting cover measured by a protecting cover detector, an ambient humidity measured by a humidity sensor, a posture at which the laser projector is placed measured by a gravity sensor, and a motion state of a human body in a preset area of the laser device.

14. The method according to claim 13, wherein:

the rotation speed of the color wheel includes rotation speed of a fluorescence wheel and rotation speed of a color filter wheel;

the temperature includes a temperature at an air entry of the laser projector and a temperature at one or more sites inside the laser projector; and the light brightness data includes at least brightness data in an illumination light path of a light machine inside the laser projector.

15. The method according to claim 9, wherein after the failure information of the laser projector is determined, the method further comprises:

converting the failure information into an audio signal, and outputting the audio signal to an audio device for playing.

16. The method according to claim 15, wherein:

the failure information includes a failure code; and converting the failure information into the audio signal comprises:

determining a text corresponding to the failure code according to the failure code, and converting the text into the audio signal; or converting the failure code into the audio signal.

17. The method according to claim 9, wherein after the failure information of the laser projector is determined, the method further comprises:

retrieving a protection strategy corresponding to the failure information; and protecting the laser projector according to the retrieved protection strategy.

18. An apparatus for controlling operation of a laser projector, the apparatus comprising:

a memory configured to store computer readable instructions; and at least one processor configured to execute the computer readable instructions to:

obtain a rotation speed of a color wheel and a rotation speed of a fan of the laser projector during a startup operation of the laser projector;

compare the rotation speed of the color wheel with a first preset parameter to determine whether the rotation speed of the color wheel is normal;

in response to determining that the rotation speed of the color wheel is abnormal, cease the startup operation;

in response to determining that the rotation speed of the color wheel is normal, compare the rotation speed of the fan with a second preset parameter to determine whether the rotation speed of the fan is normal;

in response to determining that the rotation speed of the fan is normal, continue the startup operation; and in response to determining that the rotation speed of the fan is abnormal, cease the startup operation.

19. The apparatus according to claim 18, wherein the color wheel includes a fluorescence wheel and a color filter wheel.

* * * * *